(12) United States Patent
Qiong (10) Patent No.: US 9,598,871 B2
(45) Date of Patent: Mar. 21, 2017

(54) FLOOR MEMBER WITH A HIGH FRICTION BOTTOM SURFACE

(75) Inventor: Sun Qiong, Zhangjiagang (CN)

(73) Assignee: Tower IPCO Company Limited (IE)

( * ) Notice: Subject to any disclaimer, the term of this patent is extended or adjusted under 35 U.S.C. 154(b) by 702 days.

(21) Appl. No.: 13/479,819

(22) Filed: May 24, 2012

(65) Prior Publication Data

US 2013/0055665 A1    Mar. 7, 2013

(30) Foreign Application Priority Data

Sep. 5, 2011  (CN) .................... 2011 1 02593900

(51) Int. Cl.
| | |
|---|---|
| E04F 15/10 | (2006.01) |
| E04F 15/02 | (2006.01) |
| B32B 7/12 | (2006.01) |
| B32B 27/08 | (2006.01) |
| B32B 27/30 | (2006.01) |
| E04F 15/18 | (2006.01) |

(52) U.S. Cl.
CPC ................ *E04F 15/10* (2013.01); *B32B 7/12* (2013.01); *B32B 27/08* (2013.01); *B32B 27/304* (2013.01); *E04F 15/02172* (2013.01); *E04F 15/185* (2013.01); *B32B 2255/10* (2013.01); *B32B 2255/26* (2013.01); *B32B 2307/412* (2013.01); *B32B 2471/00* (2013.01)

(58) Field of Classification Search
USPC .................................................. 52/177, 578
See application file for complete search history.

(56) References Cited

U.S. PATENT DOCUMENTS

| | | | |
|---|---|---|---|
| 5,509,715 A * | 4/1996 | Scharpf | 52/408 |
| 2002/0050116 A1* | 5/2002 | Tunis | 52/798.1 |
| 2003/0041956 A1* | 3/2003 | Pigott et al. | 156/244.11 |
| 2009/0139160 A1* | 6/2009 | Hill | 52/177 |
| 2009/0260313 A1* | 10/2009 | Segaert | 52/592.1 |
| 2011/0296780 A1* | 12/2011 | Windmoller | 52/309.1 |

FOREIGN PATENT DOCUMENTS

| | | |
|---|---|---|
| CN | 2222484 | 3/1996 |
| CN | 201265239 | 7/2009 |
| CN | 201671299 | 12/2010 |
| CN | 102352684 | 2/2012 |
| CN | 202214957 | 5/2012 |
| JP | 9131819 | 5/1997 |
| JP | 9217285 | 8/1997 |

\* cited by examiner

*Primary Examiner* — Joshua J Michener
(74) *Attorney, Agent, or Firm* — Rodman & Rodman

(57) ABSTRACT

The floor member has a top surface for walking upon and a bottom surface for placement on a floor base as part of a floating floor installation. The floor member includes a flexible plastic main substrate layer that is sandwiched between a flexible plastic wear layer and a bottom portion formed of meltable adhesive material. The meltable adhesive material has an exposed bottom surface that is the bottom surface of the floor member. The exposed bottom surface is non-adhesive and non-tacky at normal room temperatures. The meltable adhesive material has frictional properties that enable the floor member to resist manual sliding movement on a floor base but still permit manual sliding movement, thereby providing the floor member with positional stability when placed on a floor base as part of a floating floor installation.

22 Claims, 7 Drawing Sheets

FIG. 12 i
FLOOR MEMBER WITH A HIGH FRICTION BOTTOM SURFACE

This application claims the priority of Chinese Patent Application No. 201110259390.0 filed Sep. 5, 2011.

BACKGROUND OF THE INVENTION

Field of the Invention

This invention relates to a floor member that can be installed on a floor base without being bonded to the floor base as part of a "floating floor" installation, and more particularly to a novel floor member with a high friction bottom surface that facilitates selective positioning of the floor members in a "floating floor" installation.

As used herein, the term "floor member" is intended to refer to floor planks and floor tiles. However for purposes of simplification the detailed description of the invention will generally refer to floor planks, unless otherwise indicated. Nevertheless, the invention also encompasses floor tiles. Thus the concepts and structures described in connection with the term "floor plank" are also applicable to floor tiles.

DESCRIPTION OF THE DRAWINGS

In the accompanying drawings.

Corresponding reference numbers indicate corresponding parts throughout the several views of the drawings.

DETAILED DESCRIPTION OF THE INVENTION

As is well known in the art, floating floor members are usually freely slidable on a floor base during installation of the floor members on the floor base. In a floating floor installation, adjacent floor members may be joined together at their edges using suitable edge joining means or otherwise placed one next to another. When adjacent floor members are joined together or placed one next to another there can be inadvertent movement or shifting of one or more previously installed floor members from their already installed position. The shifted floor members must thus be moved back their original positions. Inadvertent shifting of floor members can occur at various stages of a floating floor installation.

To minimize inadvertent shifting of floor members during a floating floor installation it is customary to begin the floor member installation at a corner of a room. A corner starting point for a floating floor installation helps limit inadvertent shifting or sliding of the floor members from their initial placement positions on the floor base because the initially installed floor members at the corner of a room usually have a clearance space of approximately ¼ inch from the walls of the room. Thus, when the floor members of a floating floor are initially installed at a corner of a room, additional floor members are installed outwardly from the selected corner. Therefore the maximum inadvertent movement of the floor member is approximately ¼ inch.

In accordance with the corner method of floating floor installation, the relatively small ¼ inch clearance space of initially installed floor members from the walls at the corner of a room minimizes inadvertent shifting of previously installed floor members on the floor base.

Occasionally a selected assembly pattern of floor members for a floating floor installation requires that the floor members have a radial or center line symmetry about a central point of a room. Because of such symmetry it may be beneficial for the installer to start the floating floor installation away from a corner of the room, such as at the center of a room.

If a floating floor installation starts at the center of a room or away from the corner of a room any inadvertent shifting of initially installed floor members would not be limited by a wall, and can thus exceed ¼ inch. Repositioning of inadvertently shifted floor members can be an arduous task.

It is thus desirable to provide floor members with enhanced positional stability on a floor base, especially when the floor member installation starts at a center of a room or at a location that is remote from the corner or wall of a room. It is also desirable to provide a floor member with enhanced positional stability without bonding or otherwise securing the floor members to the floor base.

The present floor plank with the high friction bottom surface minimizes the problem of inadvertent floating floor member movement on a floor base even when the floor member installation begins at a location that is remote from a corner of the room.

Figure 1:
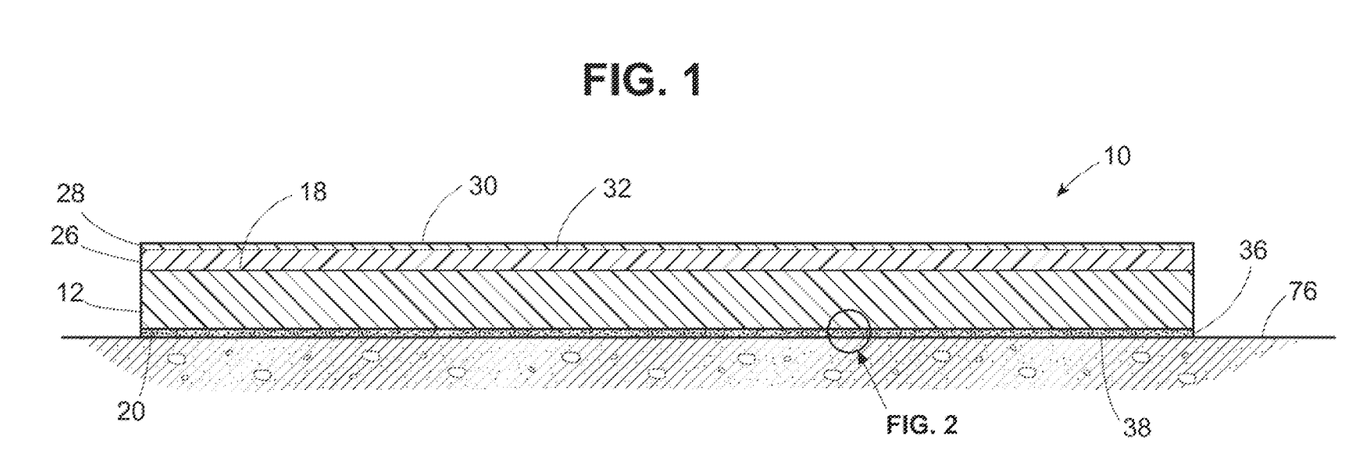
FIG. 1 is an enlarged sectional view of one embodiment of the floor member in the form of a floor plank on a floor base.
Figure 3:
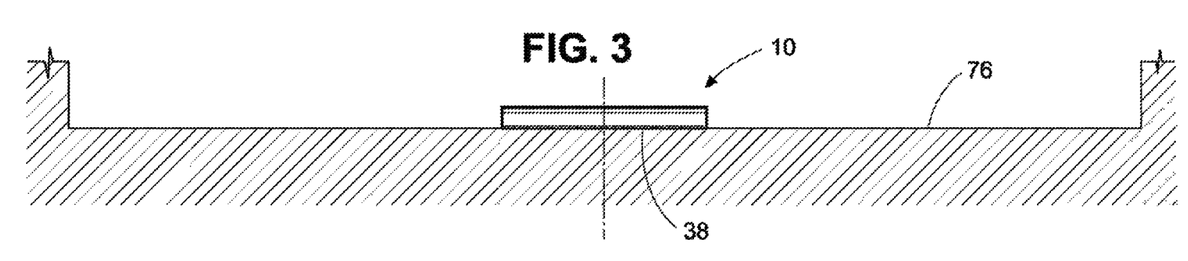
FIGS. 3-5 are simplified sectional views of three stages of a floating floor installation which shows the floor plank installation extending outwardly from the a central portion of a room.
Figure 4:
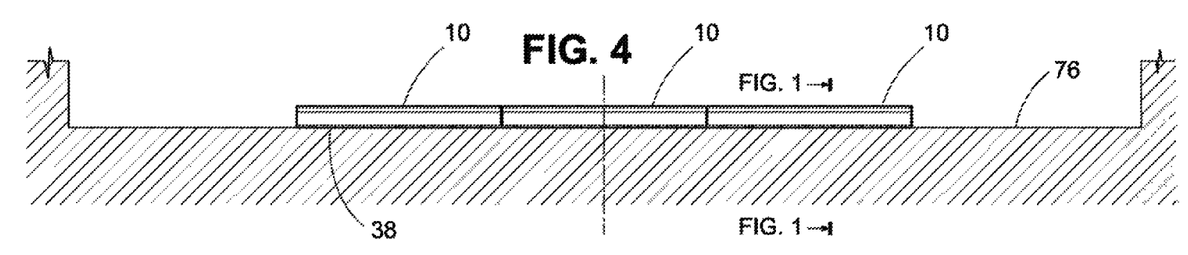

Referring to the drawings, one embodiment of the invention, in the form of a floor plank, is generally indicated by the reference number 10 in FIGS. 1 and 3.

The floor plank 10 includes a main substrate layer 12 (FIG. 1) formed of a flexible plastic material such as polyvinyl chloride (pvc) or a non-polyvinyl chloride polyolefin equivalent. The main substrate layer 12 has upper and lower surfaces 18 and 20 (FIG. 1).

A flexible plastic underlayer 26 (FIG. 1), also referred to as a wear layer, is preferably formed of polyvinyl chloride and is laminated to the upper surface 18 of the main substrate layer 12 in any suitable known manner.

A flexible plastic film 28 (FIG. 1) which can be formed of polyvinyl chloride is joined to the wear layer 26 in any suitable known manner and has an exposed surface 30 that forms the top surface of the floor plank 10. The plastic film 28 can have a visible decorative design (not shown) that characterizes the appearance of the floor plank 10. For example, the decorative design can resemble a wood grain or the mineral grain of a natural mineral such as granite, marble or other decorative stone, or any other suitable design. If desired, the surface 30 of the film 28 can also be textured. The film 28 is thus referred to as a design layer or a decorative overlayer.

The film 28 can also be transparent and the decorative design can be provided on an upper surface 32 (FIG. 1) of the plastic wear layer 26, in any suitable known manner.

Figure 2:
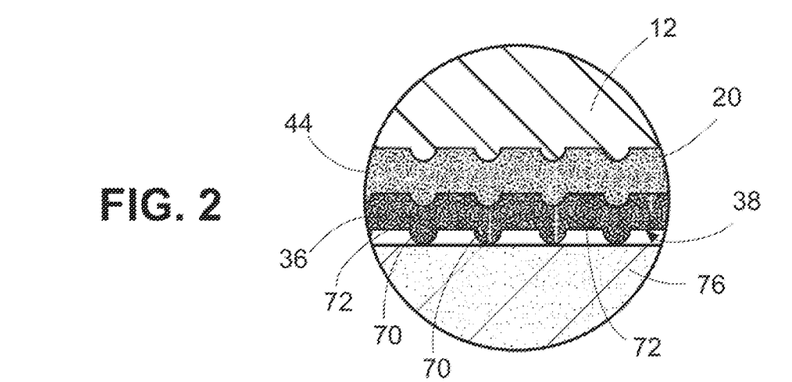
FIG. 2 is an enlarged fragmentary detail of the floor plank of FIG. 1.

The floor plank 10 further includes a bottom layer 36 (FIG. 1) of a high friction material provided below the lower surface 20 of the main substrate layer 12. The bottom layer 36 of high friction material has an exposed bottom surface 38 (FIGS. 1-3).

To accomplish the objectives of this invention I have discovered that a very suitable high friction material for the bottom layer 36 is a meltable bonding or adhesive material, such as a hot-melt adhesive material that, when dry, does not have a tacky or sticky exposed bottom surface 38.

The hot-melt adhesive material of the bottom layer 36 is preferably formed of a suitable polyester based hot-melt adhesive compound which preferably comprises, by weight percent:
1) thermoplastic elastomer, 67.5%;
2) SIS, a styrene-isoprene-styrene block copolymer, a thermoplastic elastomer rubber antioxidant: [pentaerythritol tetrakys 3-(3,5-ditert-butyl-4-hydroxyphenyl)propionate], 1.3%; and,
3) naphthenic oil, 31.2%.

Other equivalent hot-melt adhesives are known in the art.

The hot-melt adhesive layer 36 is preferably coated in a melted condition onto the lower surface 20 of the main substrate layer 12 in any suitable known manner, such as by roller application.

When the melted hot-melt adhesive layer 36 solidifies or dries after being applied and is in the non-viscous, non-tacky state, the exposed bottom surface 38 of the hot-melt adhesive has frictional properties that enable the floor plank 10 to resist manual sliding movement on a floor base but still permit manual sliding movement on the floor base. Such frictional properties provide the floor member with positional stability when placed on a floor base as part of a floating floor installation.

The exposed bottom surface 38 (FIG. 1) of the solidified hot-melt adhesive layer 36 is thus referred to as a high friction bottom surface of the floor plank 10.

In a preferred embodiment of the invention, the lower surface 20 of the main substrate layer 12 is pre-coated with a primer layer 44 (FIG. 2) of hot-melt adhesive material that enhances the bond of the hot-melt adhesive material 36 with the lower surface 20 of the main substrate layer 12 (FIG. 2). The primer layer 44 of hot-melt adhesive material is thus sandwiched between the main substrate layer 12 and the bottom layer 36 of hot-melt adhesive material (FIG. 2).

The primer layer 44 is preferably a hot-melt adhesive material formed of a suitable polyurethane based hot-melt adhesive compound which preferably comprises, by weight percent:
1) polyester polyol, 20% to 50%;
2) polyether polyols, 20% to 50%;
3) isocyanate 10% to 30%; and,
4) Alnovol® resin, (Cytec Surface Specialties GMBH of Germany), 10% to 20%.

Other equivalent hot-melt adhesives are known in the art.

Figure 5:
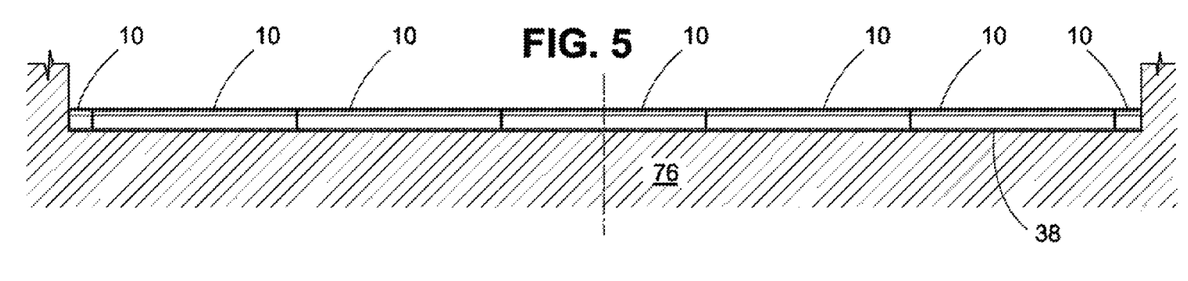

In constructing the floor member 10, the main substrate layer 12, the wear layer 26 and the plastic film 28 are preferably laminated together in a suitable known hot-press apparatus 100 (FIG. 11) to form a subassembly laminate 102. The hot-press apparatus 100 can also be used to emboss the lower surface 20 of the main substrate layer 12 with any selected three-dimensional texture or relief pattern such as a surface texture that resembles a weave or mesh. If desired, the texturing of the lower surface 20 can be in the form of a random or ordered pattern of projections 70 and recesses 72 (FIG. 5) having any selected cross-sectional profile.

Figure 9:
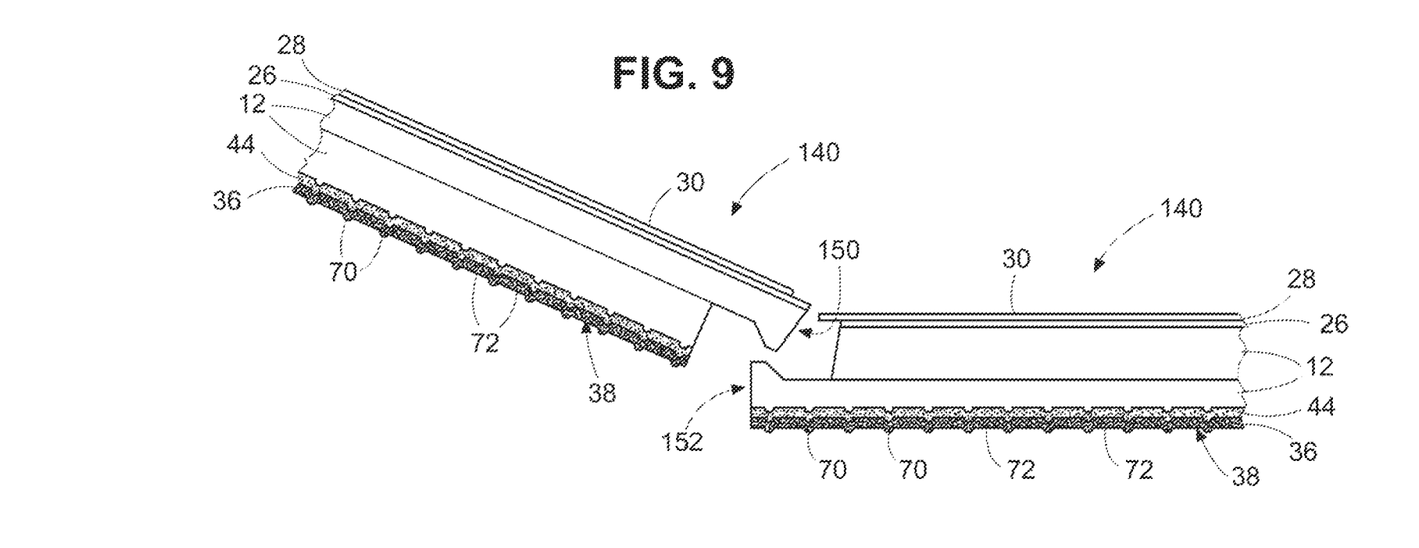
FIG. 9 is an enlarged fragmentary sectional view of joining means for joining the periphery of the floor plank of FIG. 6 to adjacent floor planks in a floating floor installation.
Figure 10:
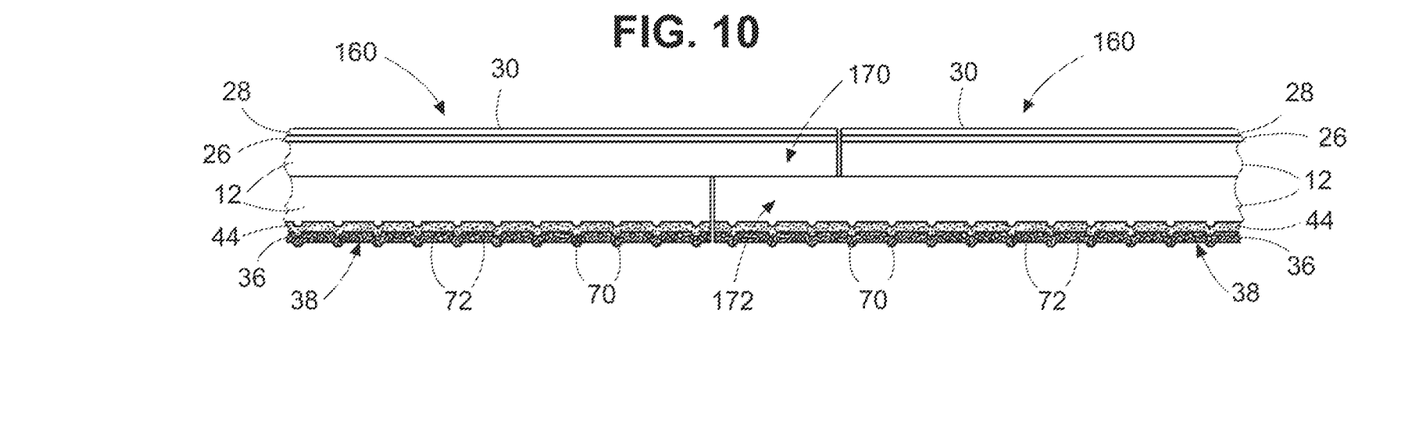
FIG. 10 is an enlarged fragmentary sectional view of joining means for joining the periphery of the floor plank of FIG. 7 to adjacent floor members in a floating floor installation.
Figure 12:
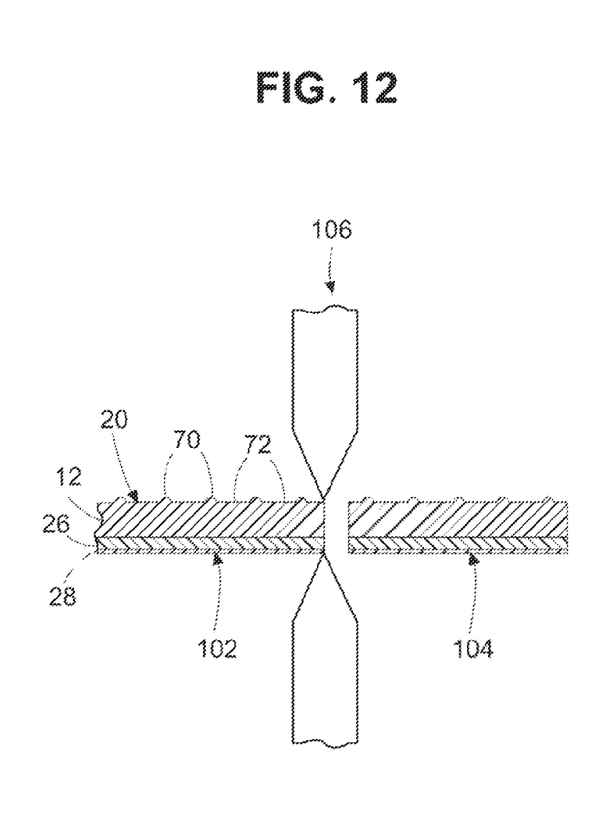
Figure 13:
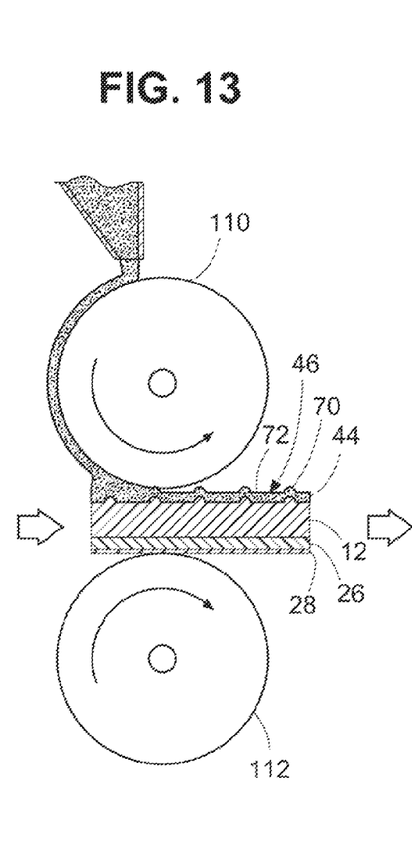

For purposes of simplicity the projections 70 and the recesses 72 are separately indicated at the bottom surface 38 of the floor plank 10 in FIGS. 2, 9 and 10, and at the bottom surface 20 of the main substrate layer 12 in FIG. 12, and at a lower surface 46 of the primer layer 44 in FIG. 13.

The projections 70 and the recesses 72 in the bottom surface 38 of the floor plank 10 can define paths that are curved, straight or have any other selected design configuration. The projections 70, recess 72 or any other texturing or relief pattern at the bottom surface 38 of the floor plank 10 establish a predetermined frictional resistance between the floor plank 10 and a floor base 76. The spaced projections 70 and recesses 72 can also define ventilation paths at the bottom of the floor plank 10.

Figure 11:
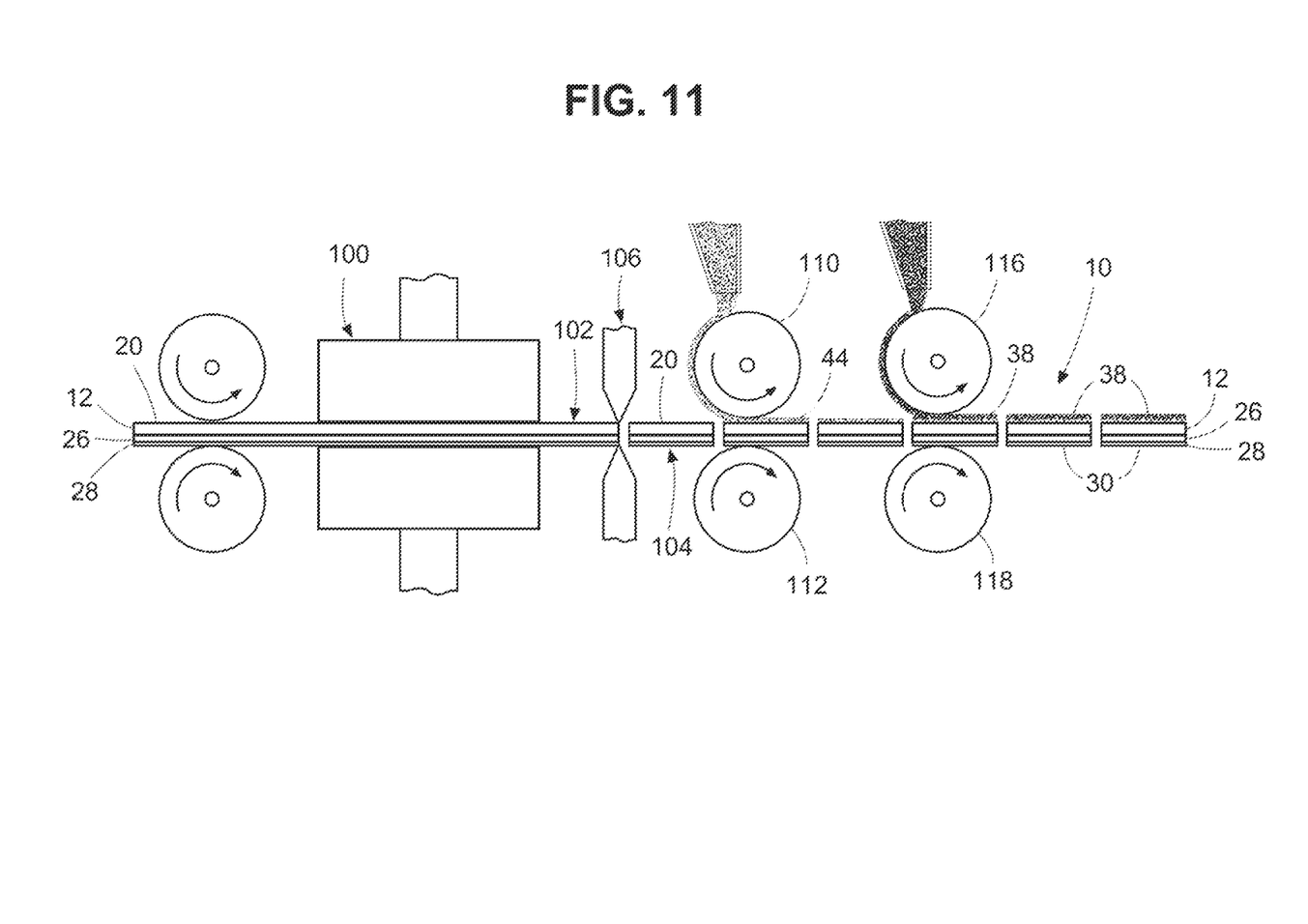
FIG. 11 is a simplified schematic view of selected manufacturing steps for constructing the floor plank of FIG. 1; and, FIGS. 12-14 are enlarged fragmentary details of some selected manufacturing steps of FIG. 11.

Referring to FIGS. 11 and 12, the subassembly laminate 102 of the main substrate layer 12, the wear layer 26 and the film 28 can be placed upside down and conveyed in any suitable known manner to a known cutter device 106 (FIG. 11). The cutter device 106 cuts the subassembly laminate 102 into single laminate pieces 104 in any suitable known manner. The cut subassembly laminate pieces 104 are then conveyed in any suitable known manner through a first set of rollers 110 and 112 (FIGS. 11 and 13) to apply the hot-melt adhesive primer layer 44 to the lower surface 20 of the main substrate layer 12. The application temperature can be approximately 130° to 180° Centigrade.

Figure 14:
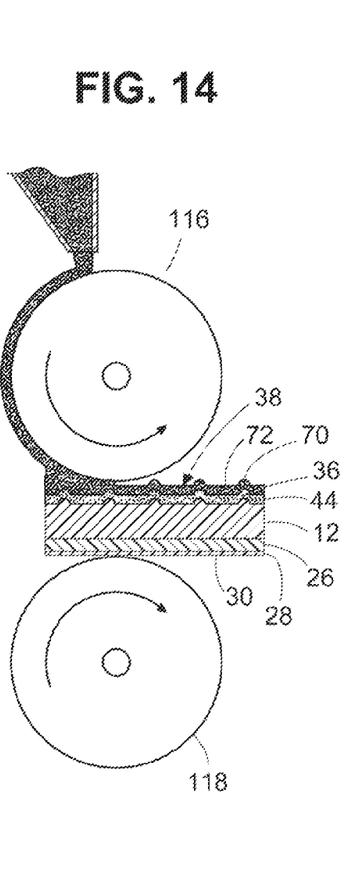

The application of the primer layer 44 of hot-melt adhesive is followed by an application of the bottom layer 36 of hot-melt adhesive onto the primer layer 44 (FIGS. 11 and 14) with the rollers 116 and 118 at approximately 160° to 230° Centigrade.

Because the hot-melt adhesive layers 44 and 36 are applied as molten hot-melt material the molten layers 44 and 36 of the hot-melt adhesive flow into or are compliant with the embossed or textured lower surface 20 of the main substrate layer 12. The layers 44 and 36 remain compliant with the embossments or texture pattern formed at the lower surface 20 after the layers 44 and 36 of hot-melt material cool down and dry at room temperature. Thus each hot-melt adhesive layer 44 and 36 is provided with the projections 70 and recesses 72 that are initially formed at the bottom surface 20 of the main substrate layer 12.

As a result the exposed bottom surface 38 of the bottom layer 36 of hot-melt adhesive has a texture or relief pattern similar to that of the texture or relief pattern of the lower surface 20 of the main substrate layer 12.

Under this arrangement the high friction bottom surface 38 can be formed with any desired surface texture or relief pattern initially formed at the bottom surface 20 of the main substrate layer 12 to provide any selected level of frictional resistance to manual sliding movement of the floor plank on a floor base 76.

The floor plank 10 is manually movable on a floor base 76 to a desired location position during installation of a floating floor. The floor plank 10 has a predetermined frictional resistance to manual sliding movement on the floor base 76 because of the relatively high coefficient of friction of the bottom surface 38 compared to floor members that do not have a hot-melt adhesive bottom surface.

The enhanced frictional resistance of the floor plank 10 to manual sliding movement on the floor base as compared to the frictional resistance of known floating floor members is generally desirable because such frictional resistance enables the floor plank 10 to have positional stability on the floor surface during installation of the floating floor.

The enhanced frictional resistance of the floor plank 10 also enables the floor plank 10 to resist inadvertent sliding on the floor base when the floor plank 10 is placed next to adjacent floor planks.

A side-by-side, loose-lay arrangement of floating floor planks 10 with plain square edge, is shown in FIGS. 1 and 3-5, and is especially advantageous to provide a temporary floor in an exhibition hall or pavilion. The side-by-side, loose-lay arrangement of the floor planks 10 protects a base floor during a short term exhibition, and the plain square edge of the floor planks 10, without edge joining means, enables the floor planks 10 to be easily removed when the exhibition concludes.

The floating floor installation can thus begin away from the corner of a room, (FIGS. 3-5) which facilitates the installation of a variety of floor assembly patterns in less time and with greater accuracy in positioning individual floor members, than is usually available with floor members that have a relative low frictional resistance to sliding movement on a floor base during floor member installation.

As previously described the floor planks 10 can be installed on a floor base without any mastic or adhesive coating on the floor base, and without any mastic or bonding adhesive on the bottom surface 38 of the floor member. Thus, during a floating floor installation the floor planks 10 can be placed on a dry floor base surface 76 in any selected position on the floor base (FIG. 3). The positional stability of the floor plank 10 on the floor base 76 because of the high friction bottom surface 38 facilitates installation of other floor planks 10 in any desired pattern. The planks 10 can be placed one next to another with or without any means for joining one plank to another.

Although the dimensions of the floor plank 10 are a matter of choice, a suitable size for the floor plank 10 can be, for example, 6 inches by 48 inches, or 12 inches by 24 inches and so on. Smaller or larger size floor planks are a matter of choice.

The floor plank 10 has a thickness that enables the floor plank to be sufficiently flexible to facilitate assembly of a plurality of the floor planks on the floor base 76.

The overall thickness of the floor plank 10 also enables the floor plank 10 to be easily cut with a utility knife, if trimming is desired. Ease of trimming of the floor plank 10 and the mastic free placement of the planks on a floor base make it convenient for a do-it-yourselfer to install the floor planks 10.

Although the thickness of the individual laminates of the floor plank 10 are generally a matter of choice, the decorative film layer 28 can have a thickness of approximately 0.25 mm to 0.75 mm. The underlayer or wear layer 26 can have a thickness of approximately 0.5 mm to 4.0 mm.

The main substrate layer 12 preferably has a thickness range of approximately 0.6 mm to 8 mm.

The primer layer 44 of hot-melt adhesive can have a thickness of approximately 0.03 mm to 0.05 mm and the bottom layer 36 of hot-melt adhesive can have a thickness range of approximately 0.05 mm to 0.1 mm.

If desired, the floor plank of this invention can be provided with any suitable known joining means for joining the edges or periphery of the floor planks to adjacent floor planks. Thus another embodiment of the floor plank is generally indicated by the reference number 140 in FIG. 6.

The floor plank 140 includes, a first known edge joining means 150 (FIGS. 6 and 9) provided at two of the four edges of the floor plank 140 and a second complementary known edge joining means 152 provided at the other two edges of the floor plank 150. The edge joining means 150 and 152 are of the type identified by the trademark Allure Clic locking system by Halstead New England Corp. of Norwalk, Conn. Thus the edge joining means 150 of one floor plank 140 is connectable at one edge to the complementary edge joining means 152 of a first adjacent floor plank 140 to form a connection between the floor plank 140 and the first adjacent floor plank.

Figure 6:
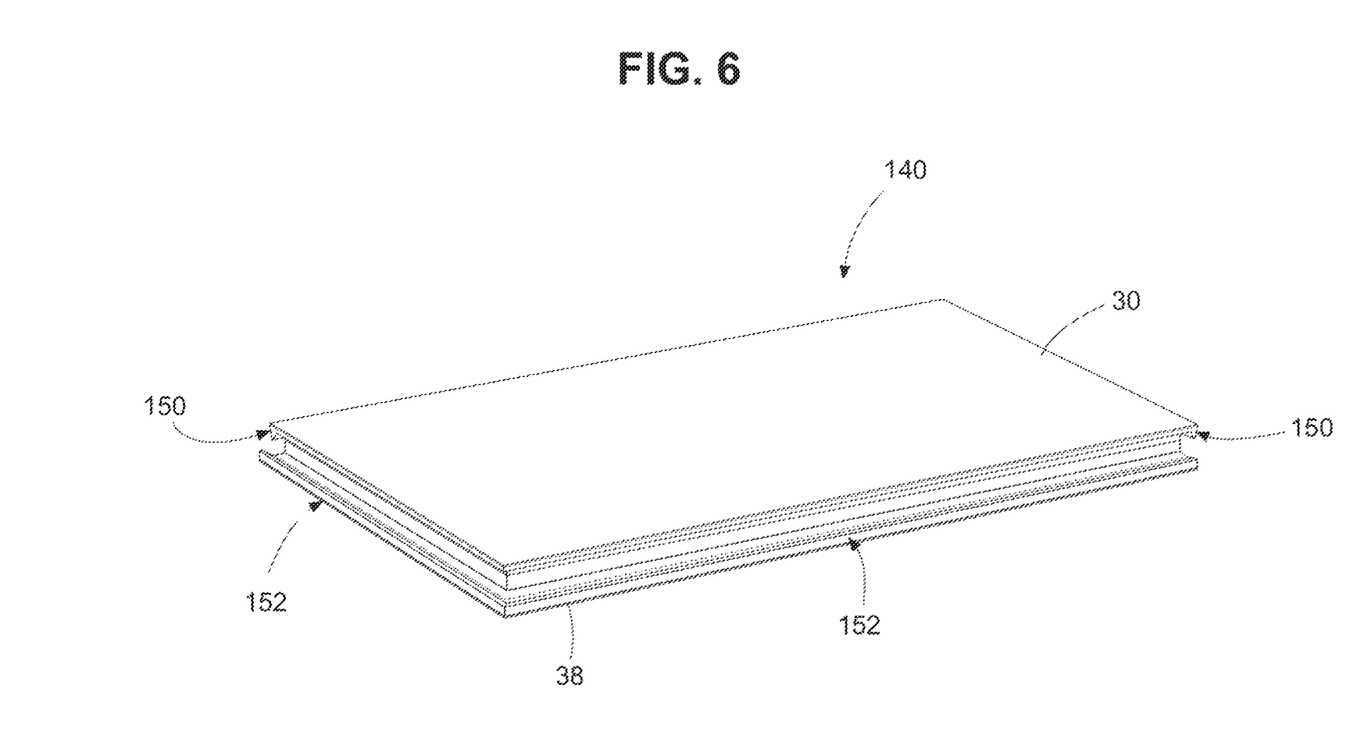
FIG. 6 is a perspective view of a floor plank incorporating another embodiment of the invention.

In a similar fashion the edge joining means 150 at a second edge of the floor plank 140 is connectable to the complementary edge joining means 152 of a second adjacent floor plank (not shown) to form a second connection between the floor plank 140 and the second adjacent floor plank.

In further similar fashion the edge joining means 152 of the floor plank 140 is joinable at a third edge of the floor plank 140 to the complementary edge joining means 150 of a third adjacent floor plank (not shown) to form another connection between the floor plank 140 and the third adjacent floor plank. And lastly the edge joining means 152 at a fourth edge of the floor plank 140 is joinable to the complementary edge joining means 150 of a fourth adjacent floor plank (not shown) to form another connection between the floor plank 140 and a fourth adjacent floor plank, and so on. The floor plank 140 is otherwise similar to the floor plank 10.

Figures 7, 8:
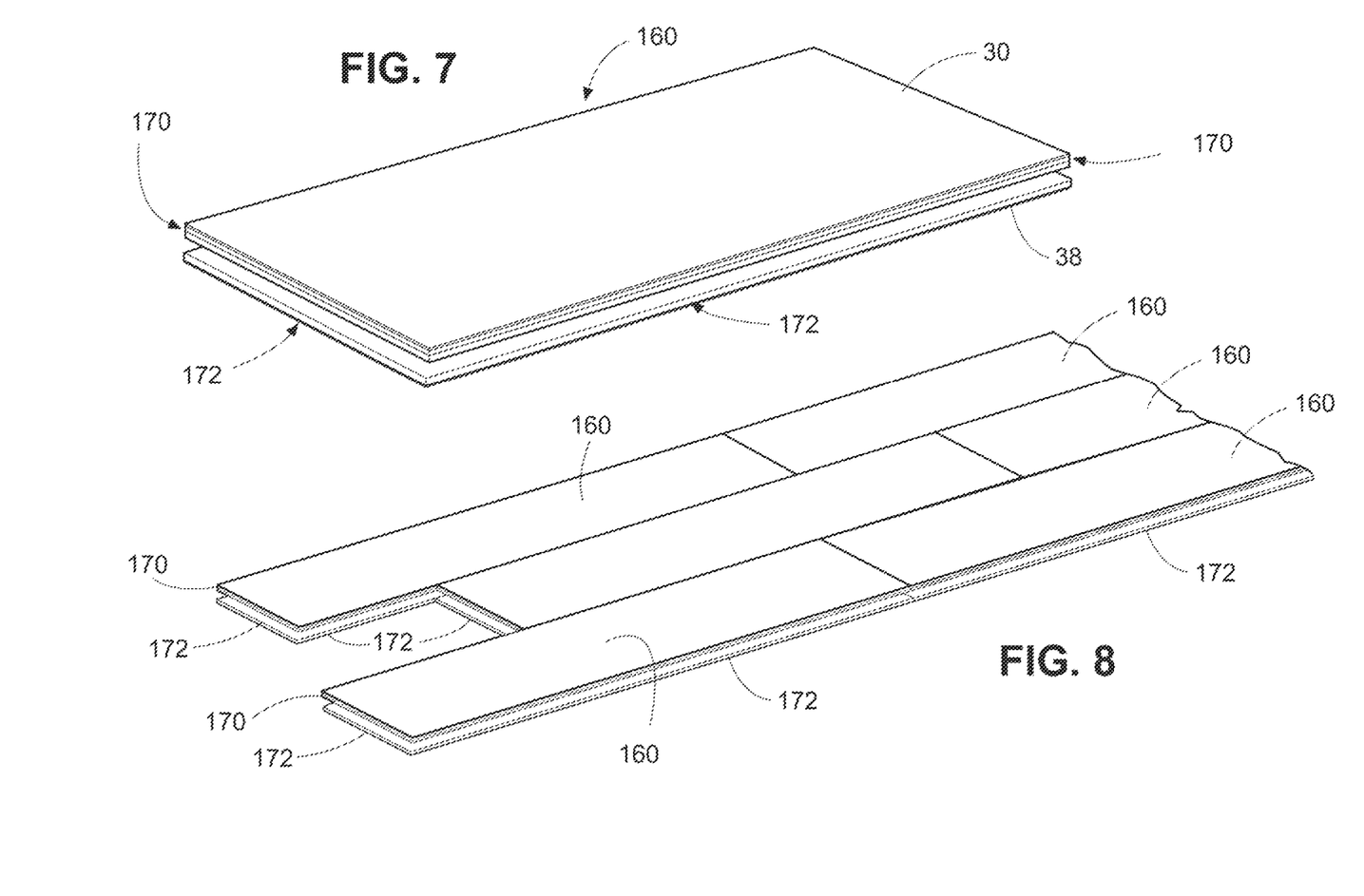
FIG. 7 is a perspective view of still another embodiment of the invention.
FIG. 8 is a simplified perspective view of an assembly pattern of the floor plank of FIG. 7.

A further embodiment of the floor plank is generally indicated by the reference number 160 in FIGS. 7-8 and 10.

The floor plank 160 includes a known edge joining means 170 at two edges and a known complementary edge joining means 172 at the remaining two edges of the floor plank 160. The edge joining means 170 and 172 are of the type identified by the trademark Allure GripStrip by Halstead New England Corp. of Norwalk, Conn. and described in detail in U.S. Pat. No. 7,155,871 the disclosure of which is incorporated by reference herein. Thus, the edge joining means 170 at first and second edges of the floor plank 160 are connectable to edge joining means 172 of first and second adjacent floor planks (FIG. 10). The edge joining means 172 at third and fourth edges the floor plank 160 (FIGS. 7 and 8) are joinable to the edge joining means 170 of third and fourth adjacent floor planks, and so on. The floor plank 160 is otherwise similar to the floor plank 10.

As various changes can be made in the above constructions and methods without departing from the scope of the invention, it is intended that all matter contained in the above description or shown in the accompanying drawings shall be interpreted as illustrative and not in a limiting sense.

What is claimed is:

1. A floor member for installation on a floor base without bonding or adhering the floor member to the floor base, the floor member comprising, a) a flexible floor member unit having a multi-sided polygonal periphery and peripheral edges, a top surface for walking upon and a bottom surface for placement on a floor base,
   b) said floor member unit having a flexible main substrate layer with upper and lower surfaces,
   c) a flexible plastic wear layer laminated to the upper surface of said main substrate layer, and d) a bottom portion of hot-melt adhesive material provided below the lower surface of the main substrate layer, said bottom portion having an exposed bottom surface of the hot-melt adhesive material that is the bottom surface of the floor member unit that is placed on a floor base, the exposed bottom surface of the hot-melt adhesive material being non-adhesive, and non-tacky at normal room temperatures to provide said floor member with a slide resistant bottom surface that minimizes inadvertent movement of the floating floor member in a floating floor installation.

2. The floor member as claimed in claim 1 wherein a decorative design is provided on the flexible plastic wear layer.

3. The floor member as claimed in claim 1 wherein a flexible plastic film is joined to the flexible plastic wear layer, said flexible plastic film having an exposed surface that is the top surface of said floor member unit.

4. The floor member as claimed in claim 3 wherein a decorative design is provided on the flexible plastic wear layer and the flexible plastic film is transparent to permit visual viewing of the decorative design through the flexible plastic film.

5. The floor member as claimed in claim 3 wherein the floor member unit has a decorative design and the flexible plastic film is formed to enable the decorative design to be visible at the exposed surface of the flexible plastic film.

6. The floor member as claimed in claim wherein the hot-melt adhesive material is a coating.

7. The floor member as claimed in claim 1 wherein the bottom portion of hot-melt adhesive material includes first and second layers of hot-melt adhesive material.

8. The floor member as claimed in claim 7 wherein the second layer of hot-melt adhesive material has the exposed bottom surface of the floor member unit and the first layer of hot-melt adhesive material is a primer layer provided between the second layer of hot-melt adhesive material and the main substrate layer.

9. The floor member as claimed in claim 8 wherein the first and second layers of hot-melt adhesive material are separately applied coatings.

10. The floor member as claimed in claim 1 wherein the lower surface of the main substrate layer is formed with a three-dimensional texture or relief pattern.

11. The floor member as claimed in claim 10 wherein the hot-melt adhesive material is compliant with the three-dimensional texture or relief pattern at the lower surface of the main substrate layer, such that the bottom surface of said floor member unit has a corresponding three-dimensional texture or relief pattern.

12. The floor member as claimed in claim 11 wherein the three-dimensional texture or relief pattern includes spaced projections and recesses that are curved or straight.

13. The floor member as claimed in claim 12 wherein the spaced projections and recesses are formed to define ventilation paths at the bottom surface of said floor member unit.

14. The floor member as claimed in claim 1 including joining means at the peripheral edges of the floor member unit for joining the floor member unit to another said floor member unit in adjacent side-by-side relationship.

15. A method of providing a floating floor member with positional stability on a floor base without bonding or adhering the floor member to the floor base comprising,
  a) forming a flexible plastic main substrate layer with a multi-sided polygonal periphery and peripheral edges, and upper and lower surfaces,
  b) laminating a flexible plastic wear layer to the upper surface of said main substrate layer, and
  c) providing the floor member with a bottom portion of hot-melt adhesive material below the lower surface of the main substrate layer such that the hot-melt adhesive material of the bottom portion has an exposed bottom surface of the hot-melt adhesive material for placement on a floor base and the exposed bottom surface of the hot-melt adhesive material is non-adhesive, non-sticky and non-tacky at normal room temperatures to provide said floor member with a slide resistant bottom surface that minimizes inadvertent movement of a floating floor member in a floating floor installation.

16. The method of claim 15 including forming the bottom portion of hot-melt adhesive material with first and second layers of hot-melt adhesive material, wherein the second layer of hot-melt adhesive material has the exposed bottom surface of the floor member, and the first layer of hot-melt adhesive material is a primer layer provided between the second layer of hot-melt adhesive material and the main substrate layer.

17. The method of claim 16 including coating the first layer of hot-melt adhesive material onto the lower surface of the main substrate layer and then coating the second layer of hot-melt adhesive material onto the first layer of hot-melt adhesive material.

18. The method claim 15 including forming the lower surface of the main substrate layer with a three-dimensional texture or relief pattern.

19. The method of claim 18 including coating the bottom portion of hot-melt adhesive material onto the lower surface of the main substrate layer such that the hot-melt adhesive material is compliant with the three-dimensional texture or relief pattern at the lower surface of the main substrate layer and the exposed bottom surface of the floor member has a corresponding three-dimensional texture or relief pattern.

20. The method of claim 19 including forming the three dimensional texture or relief pattern to include spaced projections and recesses that are curved or straight.

21. The method of claim 20 forming the spaced projections and recesses to define ventilation paths at the bottom surface of the floor member.

22. The method of claim 15 including providing joining means at the peripheral edges of the floor member for joining the floor member to another said floor member in adjacent side-by-side relationship.

* * * * *